(12) United States Patent
Hasinovic et al.

(10) Patent No.: US 7,374,592 B2
(45) Date of Patent: May 20, 2008

(54) CLEANING AND POLISHING COMPOSITION FOR METALLIC SURFACES

(75) Inventors: Hida Hasinovic, Lexington, KY (US); Tara Weinmann, Lexington, KY (US)

(73) Assignee: Ashland Licensing and Intellectual Property, LLC (ALIP), Lexington, KY (US)

( * ) Notice: Subject to any disclaimer, the term of this patent is extended or adjusted under 35 U.S.C. 154(b) by 0 days.

(21) Appl. No.: 11/640,454

(22) Filed: Dec. 15, 2006

(65) Prior Publication Data

US 2007/0209549 A1 Sep. 13, 2007

Related U.S. Application Data

(60) Provisional application No. 60/750,453, filed on Dec. 15, 2005.

(51) Int. Cl.
*C09G 1/02* (2006.01)
*C09G 1/00* (2006.01)
*C09G 1/04* (2006.01)
*C09G 1/14* (2006.01)

(52) U.S. Cl. .............. 51/304; 106/3; 106/8; 106/10; 106/11; 51/306; 51/309; 510/255; 510/256

(58) Field of Classification Search .............. 106/3, 106/8, 10, 11; 51/304, 306, 309; 510/255, 510/256

See application file for complete search history.

(56) References Cited

U.S. PATENT DOCUMENTS

| 4,218,250 | A | * | 8/1980 | Kasprzak | 106/3 |
|---|---|---|---|---|---|
| 4,440,745 | A | * | 4/1984 | Schmidt et al. | 424/78.03 |
| 4,880,557 | A | | 11/1989 | Ohara et al. | |
| 4,895,675 | A | | 1/1990 | Smith | |
| 5,085,694 | A | * | 2/1992 | Cifuentes | 106/3 |
| 5,154,759 | A | * | 10/1992 | Cifuentes et al. | 106/3 |
| 5,174,813 | A | * | 12/1992 | Cifuentes et al. | 106/3 |
| 5,246,972 | A | * | 9/1993 | Cifuentes et al. | 521/54 |
| 5,258,063 | A | * | 11/1993 | Cifuentes et al. | 106/3 |
| 5,443,604 | A | * | 8/1995 | Stowell | 51/307 |
| 5,929,004 | A | | 7/1999 | Ushijima et al. | |
| 6,864,220 | B2 | | 3/2005 | Levitt et al. | |
| 2002/0029527 | A1 | * | 3/2002 | Naney | 51/308 |
| 2003/0036024 | A1 | | 2/2003 | Fiebag et al. | |
| 2003/0113668 | A1 | | 6/2003 | Fiebag et al. | |
| 2004/0097390 | A1 | | 5/2004 | Jordan et al. | |

FOREIGN PATENT DOCUMENTS

WO PCT WO 03/044146 5/2003
WO PCT WO 2004/024857 3/2004

OTHER PUBLICATIONS

Derwent-Acc-No: 1982-54236E, abstract of Soviet Union Patent Specification No. SU 859406 B (Aug. 1981).*
Derwent-Acc-No: 1997-203995, abstract of China Patent Specification No. CN 1097209 A (Jan. 1995).*

* cited by examiner

*Primary Examiner*—Anthony J. Green
(74) *Attorney, Agent, or Firm*—Carrithers Law Office, PLLC; David W. Carrithers

(57) ABSTRACT

A polish composition for metallic surfaces containing a polish and abrasive alumina nanoparticles in a water in oil emulsion composition composed of surfactants, suspending agents, and aluminum oxide particles of high purity of 200 nanometers or less having a median particle diameter of 0.24 microns together with an aliphatic hydrocarbon solvent producing a polish having cleaning properties and an enhanced high glossed surface from a single application.

4 Claims, 2 Drawing Sheets

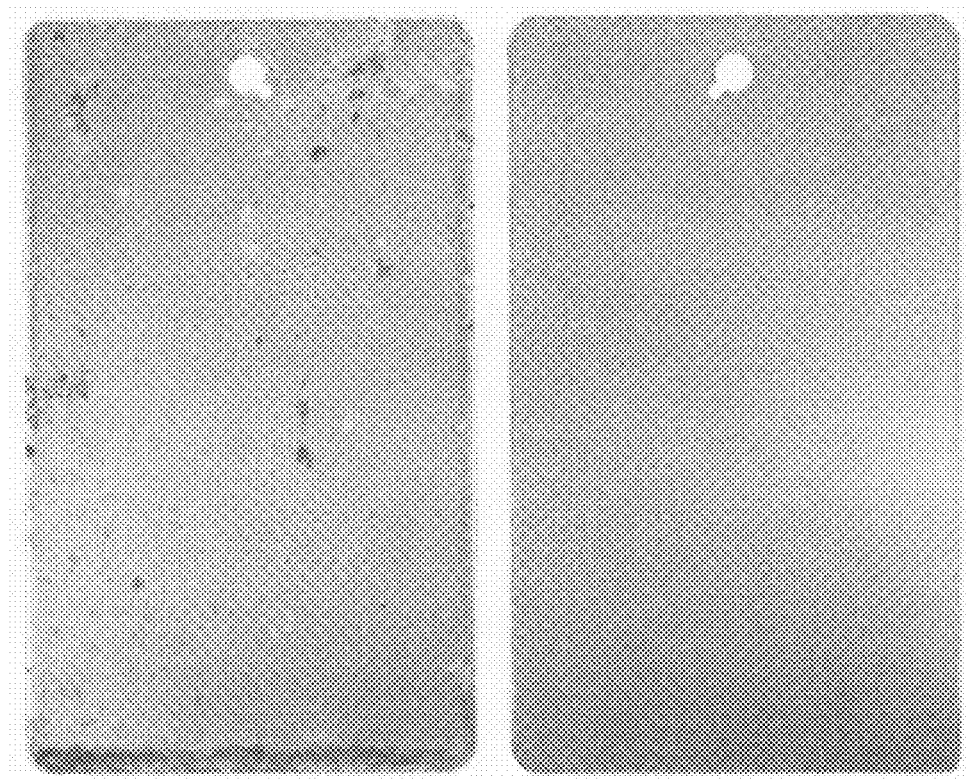

CLEANING AND POLISHING COMPOSITION FOR METALLIC SURFACES

This application claims priority from U.S. Provisional Application Ser. No. 60/750,453 filed on Dec. 15, 2005 which is hereby incorporated by reference.

BACKGROUND OF INVENTION

1. Field of Invention

This invention relates to a non-abrasive wheel polish designed to provide a smooth surface creating a deeper shine and longer lasting protection than conventional cleaners/polishes by utilizing nanometer sized polishing agent(s) in combination with conventional polishing agents. It is a water in oil emulsion containing cleaning and polishing agents including high purity aluminum oxide particles of preferably 20 micrometers or less that cleans and provides a high gloss and scratch free performance on metallic surfaces with corrosion resistance.

2. Description of the Prior Art

There are numerous polish products available on the market to protect and polish the metallic body surfaces of an automobile and also various different ways of applying the same. The most recommended procedure is to wash and dry the metallic surface, apply the protective finish to the clean dry surface, and then buff the surface. The applied polish remains as a protective finish throughout several subsequent washes but it is a time consuming labor intensive procedure.

A quick polish job is obtainable in an automatic or semi-automatic car-wash where a detergent is applied to the surface of the vehicle under high water pressure and/or using a water and detergent solution together with strips of absorbent material or sponges to remove the dirt. As part of the car-wash liquid polish may be sprayed onto the vehicle and allowed to drip dry or be dried using an air blower. The polish compositions used by professional car washes that are applied while the automobile metallized surface is wet are immediately subjected to a blow dry step and is are generally not buffed. Neither of the latter two polish procedures provides long lasting satisfactory results.

Conventional commercial polishes typically contain a detergent dispersed in water or dissolved in a solvent, often together with abrasives for dry application to a metallized surface of a automobile. The polish dries and is removed with hand or mechanical buffing machines requiring considerable labor and time.

Polishing compounds, especially those defined as cleaner polishes are generally formulated with abrasive materials such as aluminum oxide of larger than 0.20 micrometer particle size. When polishing a car's metallic surface, the cleaner polishes remove contaminants; however, the application and removal of some typically leaves a clean but dull surface. At least a second step of polishing is required with a polishing compound which typically incorporates a high percentage of natural or synthetic components and an abrasive material in order to achieve a clean coat of polish having a high gloss appearance.

SUMMARY OF THE INVENTION

A principal object of the present invention is to provide a cleaning and polishing composition which functions as a cleaner polish to remove dirt and particles of contamination and yet provides a high gloss finish in a single application.

The polishing composition of the present invention is formulated ingredients containing nanometer sized particles. It is composed with a blend of fine polishing agents and nanoparticles so that it won't damage or scratch the surface of the metal or chrome surface. It can be used on almost all metals including chrome, aluminum, stainless steel, brass, copper, gold, silver, and even billet. It can be applied with a sponge applicator or soft towel and removed with a clean soft towel or microfiber cloth. It can be applied to a surface such as a wheel in sections or on the whole wheel at once in a quantity sufficient to cover a cleaned surface with a thin film of the product. Wheel wax can be applied directly over the newly polished surface for added protection.

Selected constituents comprising the formulation of Applicant's instant invention are added as emulsified components; however, the formulated product is a blend of components mixed together, and is not dependent upon use of an emulsifier in order to disperse all of the various components together in the final product as is taught by conventional polishes applied to a dry surface.

In keeping with this object there is provided in accordance with the present invention a water in oil polish composition for use on vehicular exterior metal or metallized plastic surface, chrome, stainless steel, plastic chrome moldings, and trim. The cleaning and polishing polish composition contains natural and/or synthetic polishes together with a emulsifying agent and including at least a portion of high purity aluminum oxide having a (nano) particle size of 20 micrometers or less that cleans and provides a high gloss on automobile exterior surfaces, particularly wheels and is applied to a clean dry surface. The preferred aluminum oxide is agglomerate free and contains no magnesium oxide. The particle size is a key factor in improving the instant polish composition.

A preferred composition of the present invention comprises an aqueous solvent comprising deionized water in an effective amount of between about 32 to 33 percent by weight of the total composition; a chelating agent such as TEA (triethanolamine) in an effective amount of about 3.8 percent by weight of the total composition; a polishing agent having an average particle size of about 0.20 micrometers or less such as a high purity aluminum oxide in an effective amount of about 1.0 percent by weight of the total composition; an abrasive such as CELITE which is a flux calcined diatomaceous earth also defined as a super fine super floss having a median particle size of about 5.0 microns in an effective amount of about 20.0 percent by weight of the total composition; a hydrocarbon solvent such as CONOSOL C-200 in an effective amount of about 27.7 percent by weight of the total composition; an emulsifier, such as stearic acid in an effective amount of about 8.3 percent by weight of the total composition; an nonionic surfactant such as BURCOTERGE LFE 1000 in an effective amount of about 3.0 percent by weight of the total composition; and a corrosion inhibitor such as LUBEROS 8555 or LUBEROS RP-3118 in an effective amount of about 3.0 percent by weight of the total composition. Optional components which are not required to provide a functional polishing composition, but impart desirable qualities to the composition include a colorant such as a dye or pigment in an effective amount of about 0.005 percent by weight of the total composition; a fragrance such as bubblegum in an effective amount of about 0.10 percent by weight of the total composition; and/or a preservative such as SURCIDE P in an effective amount of about 0.1 percent by weight of the total composition.

More particularly a preferred embodiment of the present invention consist essentially of an aqueous solvent of deionized water in an effective amount of between about 25 to 40 percent by weight of the total composition; a chelating agent such as TEA 85% (triethanolamine) in an effective amount of about 2.0 to 6.0 percent by weight of the total composition; a polishing agent having an average particle size of about 200 nanometers or less such as a high purity aluminum oxide, such as Reynolds RC-UFX MAR, in an effective amount of about 0.1 to 3.0 percent by weight of the total composition; an abrasive such as CELITE which is a flux calcined diatomaceous earth also defined as a super fine super floss having a median particle size of about 5.0 microns in an effective amount of about 5.0 to 35.0 percent by weight of the total composition; a hydrocarbon solvent such as CONOSOL C-200 in an effective amount of from about 10 to 40 percent by weight of the total composition; an emulsifier, such as stearic acid in an effective amount of about 2.0 to 15.0 percent by weight of the total composition; an nonionic surfactant such as BURCOTERGE LFE 1000 in an effective amount of about 0.1 to about 8.0 percent by weight of the total composition; and a corrosion inhibitor such as LUBEROS 8555 in an effective amount of about 0.1 to 10.0 percent by weight of the total composition. Optional components which are not required to provide a functional polishing composition, but impart desirable qualities to the composition include a colorant such as a dye or pigment in an effective amount of about 0.005 percent by weight of the total composition; a fragrance, such as bubblegum, in an effective amount of about 0.1 percent by weight of the total composition; and/or a preservative such as SURCIDE P in an effective amount of about 0.1 percent by weight of the total composition.

It is an object of the present invention to produce a one step single application cleaning and polishing composition with the desired characteristics of malleability, durability, and solidity at ambient temperature.

It is another object of the present invention to provide a magnesium and aluminum wheel polish formulation.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a photograph of an untreated panel subjected to a Humidity Chamber Corrosion Test;

FIG. 2 is a photograph of a panel treated with a polish according to the composition of Example 1 of the present invention subjected to a Humidity Chamber Corrosion Test.

DESCRIPTION OF THE PREFERRED EMBODIMENT

Figure 3:
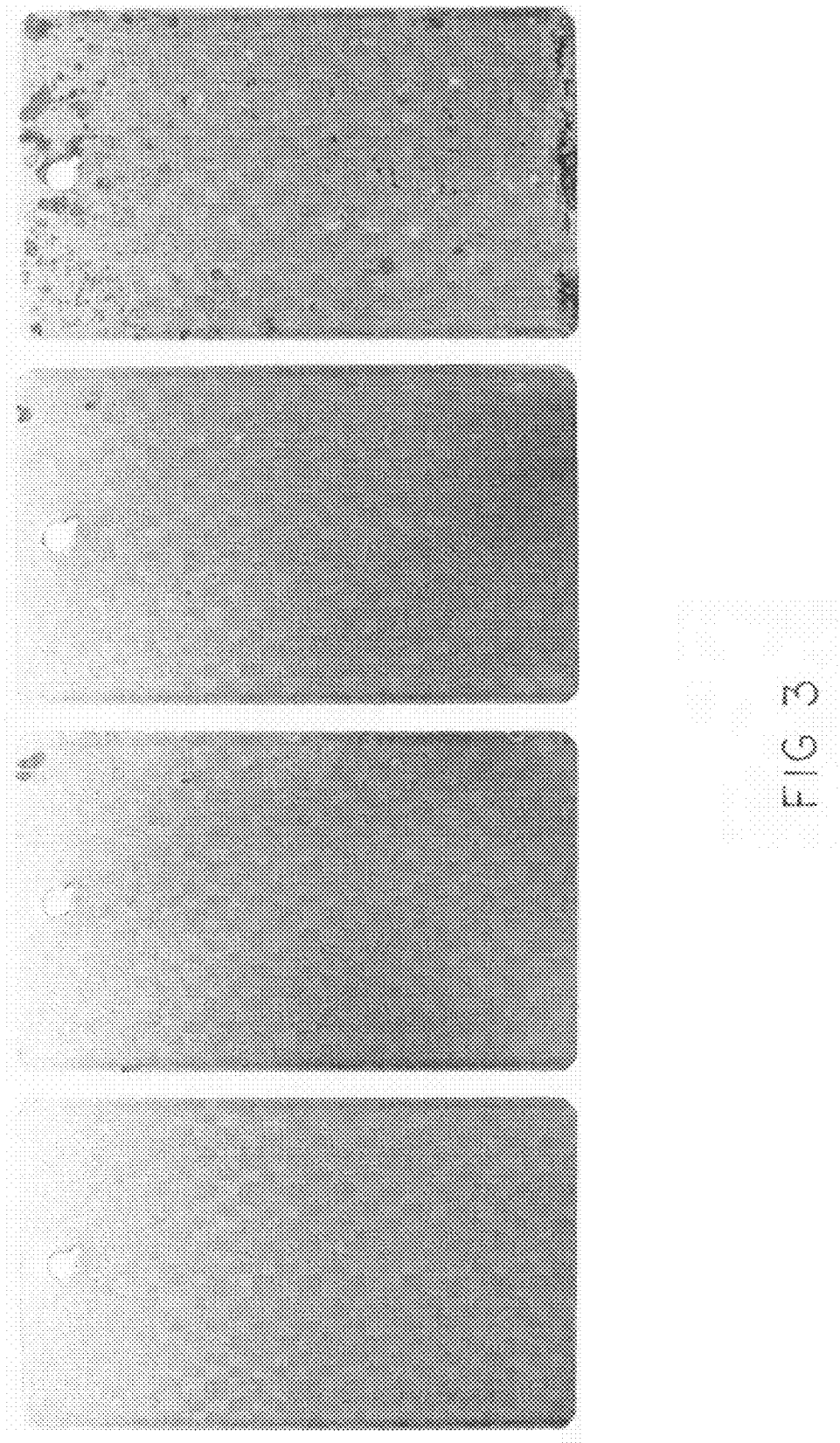
FIG. 3 is a comparison photograph showing a panel treated with a polish according to the composition of Example 1, (Formulation A), of the present invention; together with panels treated with a leading competitor's metal polish cream Product, (Formulation B); and a leading competitor's mag and aluminum polish, (Formulation C); and (D an untreated panel), all of which were subjected to the same Humidity Chamber Corrosion Test.

The instant invention is particularly directed to reducing the effort of providing a glossy finish on the metallic exterior surface of a vehicle's wheels by combining the step of applying a cleaner and a polish in a single application. The exterior surface of the automobile wheel is washed in a conventional manner using appropriate conventional cleaning agents such as detergents in the water and the surface is then rinsed using clean water. The surface is dried after rinsing and before the polish is applied thereto.

One preferred embodiment of the instant invention comprises a polish composition utilizing a selected amount of blended components and solvent for providing a cleaning action to the vehicle surface and leaving a residue of polish which upon buffing yields a high gloss surface.

The polish is a water in oil emulsion. The water in oil emulsion of the present invention is comprised of at least two phases. The organic phase containing the polish product constitutes from about 30 to about 70% by weight of the total composition and the water phase constitutes the remaining portion of the total composition of about 30% to about 70% by weight.

The minor component being water and the major component is a combination of an aliphatic hydrocarbon solvent and a polish product including additives thereto. The ratio of water to the combination of solvent and polish product is in a ratio of about 1:1 to about a 1:3 whereby the value of 1 represents the water. Typically the water used in the formulation is soft or demineralized water.

The composition of the present invention may be used in the form of emulsions with an oil phase dispersed in a continuous aqueous phase and a water phase in which water droplets are dispersed in a continuous oil phase. The emulsions are prepared by separately preparing an aqueous phase containing polishing agents dispersed in water phase and an oil soluble phase containing oil soluble components. Both the water and oil phases are heated to about 150 to 170° F., then the oil phase is added to the water phase The water phase of the composition of the present invention was formed by placing water in a tank, adding triethanolamine and mixing together. CELITE super fine super floss, flux calcined diatomaceous earth, was added to the tank and mixed well to ensure a proper dispersion. The water phase was heated to between 150 and 170° F. while mixing.

The oil phase of the composition of the present invention was prepared by mixing CONOSOL C-200 (hydrocarbon solvent), stearic acid, BURCOTERGE LFE 1000 (nonionic surfactant), and LUBEROS 8555 (oil soluble corrosion inhibitor) in a separate mixing tank and heating to between 150 and 170° F.

The oil phase mixture was added to the water phase mixture at ambient temperature while mixing using a high shear mixer to insure a proper emulsification. The following ingredients were added and mixed in the following order: LIQUITINT royal blue tine L85010, bubble gum flavor and SURCIDE P (preservative).

The resulting composition is a light blue creamy emulsion. Application to a metallized surface or other surface to be treated applied as a liquid or semi-solid paste results in an easy wiping and removal of excess product from the surface resulting in a glossy surface without streaks. A preferred method of application is applying with a sponge onto the dry surface whereby upon drying the surface is then buffed with a cloth, towel, and/or other absorbent material to dry and simultaneously buff at the same. The oil based composition allows cleaning and polishing in a single step.

An emulsifier which may also be a surfactant stabilizes the emulsion preventing separation into separate phases. Both the aqueous phase and/or the solvent phase may include thickening agents, emulsifiers, anti-static agents, surfactants, suspension agents, colorants, fragrances, and preservatives.

Whereas conventional polishing products often utilize a surfactant to stabilize the final product and maintain it as an emulsion, the instant composition utilizes a surfactant only to aid in wetting of the surface to be treated rather than as an emulsifier.

Emulsifier (Nonionic Surfactant)

The water in oil emulsion of the present invention contains an emulsifying agent of surfactants which is compatible in the predominantly aliphatic hydrocarbon mixture phase. The nonionics are important in that they promote emulsification of the oil and water phases and prevent coalescence of the dispersed water phase in the final emulsion composition.

A preferred emulsifier is BURCOTERGE LFE 1000 which is a controlled foam nonionic surfactant, which removes silicon oils, detergent for oil and grease, and emulsifies oils and greases to prevent re-deposition, and has a specific gravity of 0.96, density of 8.02 lbs/gallon, and viscosity of about 75 cps at 25° C. It is contemplated that other suitable emulsifiers may be selected from the group comprising polyglycerol ester of oleic acid, polyoxyethylene sorbitan fatty esters such as the palmitate, stearate and oleate esters each with 20 moles of ethylene oxide (polysorbate 40, 60, and 80 respectively), glycol, glycerol, and sorbitol esters such as the laurate, oleate, palmitate and stearate esters, sorbitan sesquioleate, sorbitan tristearate sorbitan trioleate, tall oil alkanolamides, polyglycerolleate, polyoxyethylene trioleate, and oleic, stearic or montanic acid. The amount of emulsifier can vary. It is recommended that the least amount of emulsifier be used to provide an effective amount capable of maintaining a stable emulsion.

A long chain fatty alcohol provides a nonionic surfactant which includes cetyl, stearyl alcohol, ethoxylated fatty alcohol, cetyl palmitate, cetyl myristate, polyethylene glycol stearate, glyceryl monostearate, monolactate, monooleates, tallow triglycerides and ethoxylated esters. Polyoxyethylene sorbitan monooleate, alkyl glucosinates, ethoxylated cetyl alcohol, ethoxylated stearyl alcohol, and polyoxyethylene nonylphenol represent suitable ethoxylated esters. Alcohol alkoxylate, a polyol ester of a fatty acid, a polyoxethylene fatty acid amide, a polyakylene oxide block copolymer, an ethoxylated alkyl mercaptan, an ethoxylated amhydrosorbitol ester, and an alkyl polyglycoside are useful nonionic surfactants. Alcohol alkoxylates may include ethoxylated $C_6$-$C_{18}$ linear and branched alcohols, ethoxylated with about 2 to about 80 moles of ethylene oxide, such as ethoxylated lauryl alcohol, ethoxylated stearyl alcohol, and ethoxylated mixtures of $C_6$-$C_{18}$ alcohols, and alkoxylated natural alcohols such as ethoxylated propoxylated pine oil ethoxylated soya sterol. Also suitable are amine oxides prepared by hydrogen peroxide oxidation of tertiary aliphatic amines such as cetyldimethylamine oxide, stearyldimethylamine oxide, tallow-bis(2-hydroxyethyl) amine oxide, stearyl-bis (2-hydroxyethy) amine oxide as set forth in U.S. Pat. No. 6,506,715 hereby incorporate by reference.

Polyol esters of fatty acids include saturated fatty acid monoglycerides, such as glycerol monolaurate, glycerol monococo ester, glycerol monotallow ester, glycerol monostearate, and the like; saturated fatty acid diglycerides, such as glycerol distearate, glycerol dilaurate and the like; unsaturated fatty acid monoglycerides, such as glycerol monooleate, glycerol monoricinoleate, and the like; unsaturated fatty acid diglycerides, such as glycerol dioleate, glycerol dilinoleate, and the like; glycol esters of fatty acids, such as propylene glycol monostearate, ethylene glycol monostearate, ethylene glycol monolaurate, diethylene glycol monooleate, diethylene glycol monostearate, and the like; and anhydrosorbitol fatty acid esters, such as mono, di and tri esters of 1,4-sorbitan with fatty acids such as stearic acid, palmitic acid and oleic acid.

Polyoxyethylene esters of fatty acids are polyethylene glycol mono- and di-esters of fatty acids comprising a polyethylene glycol portion having from about 5 to about 30 ethyleneoxy units, esterified at one or both ends with fatty acids such as stearic acid, lauric acid, oleic acid, and mixed fatty acids derived from natural oils such as coconut oil, castor oil, tall oil, and the like.

Fatty acid amides include diethanolamine fatty acid condensates such as coco diethanolamide, lauric diethanolamide, tall oil diethanolamide, and the like, and monoalkanolamine fatty acid condensates such as coco monoethanolamide, lauric monoethanolamide, stearic monoisopropanolamide, oleic monopropanolamide, and the like.

Polyoxyethylene fatty acid amides are ethoxylated mono and dialkanolamides having from about 2 to about 50 ethylene oxide groups, including ethoxylated lauric monoisopropanolamide, ethoxylated stearic diethanolamide, ethoxylated myristic monoethanolamide, ethoxylated oleic diethanolamide, and the like.

Polyalkylene oxide block copolymers include copolymers of ethylene oxide and propylene oxide initiated by ethylene glycol, propylene glycol, trimethylol propane, and the like, and have either linear or branched structures, depending on whether the initiator has two or three hydroxyl groups, respectively.

Ethoxylated alkyl mercaptans, include linear or branched alkyl mercapatans such as dodecylmercaptan, ethoxylated with 2 to 10 moles of ethylene oxide per mole of mercaptan.

Ethoxylated anhydrosorbitol esters are mono, di and tri esters of 1,4-sorbitan with fatty acids such as stearic acid, palmitic acid and oleic acid that have been ethoxylated with about 4 to about 20 moles of ethylene oxide per mole of anhydrosorbitol ester.

Alkyl polyglycosides are glycosides (acetals) of $C_6$-$C_{20}$ alcohols with a monosaccharide such as glucose, fructose, lactose, mannose, xylose and the like or a polysaccharide or oligosaccharide such as isomaltose, maltose, cellobiose, mellobiose, maltotriose and the like.

The concentration of the nonionic emulsifier is added in an amount of from 0.1 to 10% by weight, more preferably from about 0.5 to 8% by weight, more preferably in an amount of from about 0.75 to about 6% by weight, more preferably in an amount of from about 1.0 to 5.0 percent by weight and more preferably from about 2.0 to about 4.0 percent by weight. One preferred embodiment utilizes a concentration of 3.0 percent by weight.

Hydrocarbon Solvents

Solvents useful in the formulation are predominately aliphatic hydrocarbon solvents. In addition to being a carrier for the film forming ingredients, the hydrocarbon solvent functions both to remove oil based stains as well as to dissolve polish previously deposited on the surface preventing polish buildup. The hydrocarbon solvent should have an appropriate evaporation rate in order to provide adequate contact time to dissolve old polish on the surface to be treated, but not so slow as to result in smearing and loss of gloss of the deposited film. Moreover, the hydrocarbon solvent aids in cleansing and in the aid of the removal of residual water upon application of the product on a wetted surface.

For instance, hydrocarbons containing up to 100 percent aliphatic hydrocarbons are most preferable and hydrocarbons containing less than 1 percent aromatic content are deemed very desirable. Also useful are solvents typically containing from about 10 to 90 percent aliphatic hydrocarbons and from about 0 to 10 percent aromatic hydrocarbons. Solvents deemed suitable which contain less than 10% aromatic hydrocarbons include odorless naphtha mineral spirits, turpentine, kerosene, V.M.& P, naphtha, Stoddard solvent, and mixed alkanes that have a flash point of about 40° C. Another useful light distillate is CALUMET 420-460 (LVP-100). A synthetic isoparaffinic hydrocarbons such as ISOPAR M or ISOPAR E, isoparaffinic solvents, CONOSOL 200, LPA 210, LVP 200 are also useful solvents in the present invention. The solvent concentration can vary from about 15% to about 65% by weight of the final formulation. As shown in the examples, the preferred embodiment utilizes predominately aliphatic hydrocarbons such as CONOSOL C-200 (a hydrocarbon solvent), which is a middle distillate at about 27.7 percent by weight of the total composition having an initial boiling point about 98° C. and an end boiling point below about 232° C. with a flash point of about 102° C., Organic solvents useful in the present invention include isoparaffins, aliphatic hydrogen solvents, paraffinic solvents, paraffins, synthetic isoparaffinic solvents. The isoparaffinic solvents are highly aliphatic compounds containing a high percentage of isoparaffins. The organic solvents used in the present invention are typically considered high boiling solvents having a low vapor pressure typically less than 1.0 mm Hg at 20° C. and preferably 0.1 mm Hg or less at 20° C. Furthermore, the most preferred ISOPAR solvents reportedly have a vapor pressure of about 10 mm Hg at 38° C. and more preferably have a vapor pressure of about 4 mm Hg at 38° C. The evaporation rate is an important criterion in selection of the organic solvent.

It is also anticipated that white spirits, such as are produced by SHELLSOL (Shell Co. And EXXSOL produced by ExxonMobil Corporation can also be utilized as the solvent.

The high boiling solvent is added in an effective amount of up to 60 percent by weight, more preferably in a range of from between 0.01 to 50.0 percent by weight, more preferably in a range of from 5.0 to 40.0 percent by weight, more preferably in a range of from between 10.0 to 30.0 percent by weight based on the total weight of the composition.

A preferred embodiment described in Example 1 of the present invention includes about 27.7 percent by weight of CONOSOL C-200 based on the total weight of the composition blend.

Water

Water functions as a carrier for ingredients in the polish composition and to remove water-based stains. The amount of water will range from about 10 to 60 percent by weight of the total weight of the composition, more preferably from 15 to 50 percent by weight of the total weight of the composition, more preferably from about 20 to 40 percent by weight of the total weight of the composition, and more preferably from about 25-35 percent by weight of the total weight of the composition. A preferred embodiment as described in Example 1 is about 33 percent by weight of the total weight of the composition.

Polishing Abrasives

Abrasives which can be utilized in the present composition depend upon the nature of the surface to be cleaned and polished. The present invention utilizes polishing abrasives in amounts from 0 to 50 percent by weight of the total weight of the composition and preferably from 10 to 40 percent by weight of the total weight of the composition.

The fine polishing abrasives are ground to a size to promote good suspension. The abrasives are insoluble, inert, and nonhydroscopic and will not deteriorate in aqueous or solvent solutions. The abrasive functions as a pigment before and after application to the surface to be treated to produce a white haze visible to indicate presence of the polish and need for removal of same in the polishing procedure. The fine abrasives also smooth the surface being polished by filling in small cracks and crevices, and aids in prohibiting the formation of water spots. The fine abrasives also enhance the ability of the polish to dry rapidly by increasing the surface area of the polishing composition on the treated surface. The nanometer sized particles aid in providing a larger surface area for the sheeting off of the aqueous phase of the emulsion and allows the solvent phase components to cover and adhere to the surface being treated as a film upon breaking of the water/solvent emulsion.

Suitable abrasives are selected from the group comprising diatomaceous earth, aluminum silicate, aluminum oxide, silicon dioxide, aluminum dioxide, cerium oxide, zirconium oxide, titanium oxide, manganese dioxide, Fuller's earth, bentonite, silica, micro-crystal silica, talc, pumice tripoli, hydrated calcium silicate, zeolite, anhydrous aluminum silicate, chalk, colloidal clay, magnesium oxide, red iron oxide, and tine oxide all of which should preferably be available in a particle size of less than 5 microns (500 nanometers) or smaller.

The present invention uses an abrasive compound under a trade name of CELITE super fine super floss comprising of flux calcined diatomaceous earth. It is further defined as a plankton marine diatomite, fine powder, median particles size of 5.0 microns having an typical chemical composition of ($SiO_2$ 89.6%, $Al_2O_3$ 4.0, $Fe_2O_3$ 1.3, $P_2O_5$ .2, $TiO_2$ .2 CaO 0.5, MgO 0.6 and $Na_2O+K_2O$ 3.3%). WHITE MIST or SUPER FLOSS can also be used in the instant invention to obtain satisfactory results in place of the super fine super floss. In addition, SIPERNAT 22 S, a synthetic amorphous precipitated silica with particle size of 7.0 micrometers from Degussa can be substituted for CELITE SFSF.

A particularly important constituent is the use of nanoparticles in the instant composition comprising a high purity aluminum oxide having an average particle size of about 0.20 micrometers, (200 nanometers), or less as measured using a Sedigraph 5100-MPD(D50) Sedigraph 5100 obtained from Micromeritics Instrument Corporation. The preferred embodiments of the instant invention utilize an alumina having a particle size of 200 nanometers with a median particle diameter of 0.24 microns (240 nanometers). Thus, the particles range in size up to 0.2 micrometers. The particles are defined as a high purity alumina grade RC-UFX MAR (no Magnesium oxide), and agglomerate free which was available from Reynolds Metals Company and Baikowski. Because most polishing compounds are generally formulated with aluminum oxide have particles sizes greater than 0.20 micrometers, polishing a surface with the same component usually leaves a clean but dull surface requiring polishing with a high gloss polish to obtain a glossy surface. Because the instant invention utilizes aluminum oxide having nanoparticles, another abrasive is provided to clean the surface, yet the nanoparticles do not interfere with the polishes thereby leaving a high gloss polish surface produced in a one step by applying the polish and removing same by buffing.

Chelating Agents

A chelating agent such as triethanolamine, (TEA), ((HOCH$_2$CH$_2$)$_3$N) comprising (85% triethanolamine min, monoethanolamine 0.5% max, diethanolamine 15% max) functions as a detergent builder for neutralizing heavy minerals such as Ca++ and Mg++ in water. Thus if the water is hard and contains significant amounts of calcium or other additives, the chelating agent combines with the ions neutralizing the same, which assists in producing stable emulsions of oils and polishing agents in water.

Another chelating agent suitable for use in the present composition is ethylene diamine tetracetic acid (EDTA), and/or morpholine.

The chelating agents are used in amounts up to 10 percent by weight based on the total weight of the composition, more preferably from about 0.1 to 7 percent by weight based on the total weight of the composition, more preferably from about 0.5 to 6 percent by weight based on the total weight of the composition, more preferably from about 1 to 5 percent by weight based on the total weight of the composition, more preferably from about 2 to 4 percent by weight based on the total weight of the composition. A preferred embodiment disclosed in Example 1 uses about 3.8 percent by weight based on the total weight of the composition.

Corrosion Inhibiting Agents

A corrosion inhibitor such as LUBEROS 8555 from Lube Ros, a division of Burlington Chemical in Burlington, N.C., comprises a predominately aliphatic oil soluble formulated blend for use in formulating oil and/or solvent based rust preventives forms a protective non-staining coating for short term use. The corrosion inhibitor also imparts rust preventive properties to formulations, and in low viscosity oil/solvent acts as a base with water insoluble lubricant additives such as esters or oleates. It also polishes, forms a protective non-staining coating for short term use. It comprises 10-20% nap oil (100-200) sus, 5-10% water insoluble additives and the balance mineral spirits.

It is anticipated that LUBEROS RP-3118 and 3115 are corrosion inhibitors comprising oil soluble blends which could be utilized as substitutes for the LUBEROS 8555 in the present invention.

Preservatives

A biocide, such as SURCIDE P, DANTOGARD, (DMDM Hydantoin) or TROYSAN 395 is optionally used as a preservative in the product. The biocide is not a necessary component to provide a functional polish composition for use on wetted surfaces; however, the preservative provides a useful shelf life to the product.

The biocide preservative is added in an effective amount to preserve the polish composition product and ranges from 0.01 to 2.0 percent by weight, and more preferably in a range of from 0.05 to 1.0 percent by weight, and more preferably in a range of from between 0.1 and 0.5 percent by weight based on the total weight of the composition. A preferred preservative for Example 1 is SURCIDE P, in an effective amount of up to 1 percent of the total weight of the composition. Other preservatives such as polymethoxybicyclic oxazolidine may also be useful in the present invention.

Fragrances

Although not required, an effective amount of one or more fragrances, such as vanilla, bubble gum, orange, fruity bouquet and the like may be added to the instant invention to impart a desirable scent to the product. Preferably the fragrance is present in an amount of up to 2 percent by weight, and more preferably of from between 0.001 to 1.0 percent by weight, and more preferably of from between 0.01 to 0.5 percent by weight. One preferred embodiment contains about 0.2 percent by weight of bubblegum based on the total weight percent of the composition.

Dyes

As an option, a dye can be added to the composition to provide a desirable color or tint. A preferred dye for the composition set forth in Example 1 is LIQUITINT royal blue L95010 in an amount of about 0.005 percent based on the total weight of the composition. Of course, it is contemplated that an effective amount could comprise more or less dye or tint up to 1% of the total weight of the composition.

Other colorants suitable for use in the instant composition include metallized azos such as barium or calcium salts, naphthol, pyrazalones, rhodamines, quinacridones, phthalocyanines, phthalocyanines, pigments including the magnesium salts, lead chromes and silicochromates, zinc chromes, barium chromate, strontium chromate, titanium nickel yellow, liminites, haematites, magnetites, micaceous oxides of iron, iron ferreites and Prussian blue.

Additional Ingredients

Optional components such as fungicides, UV absorbers, moisturizers, and/or colorants may also be added to the polish composition in effective amounts of less than 1 percent by weight based on the total weight of the composition. For instance, UV absorbers may include benzotriazoles and benzophenones.

Application:

The polish is applied by rubbing the composition onto a wet or dry metallic surface, preferably in a circular motion. After coating the surface, the coated surface is dried until a translucent film is formed thereon, which may be buffed to remove excess polish and leave a uniform, durable, high gloss water resistant protective film thereon.

EXAMPLES

The following examples further describe the polishing compositions of the instant invention, methods of using the polishing compositions, and the tests performed to determine the various characteristics of the polishing compositions. The examples are provided for exemplary purposes to facilitate understanding of the invention and should not be construed to limit the invention to the examples.

Example 1

| Ingredients | Percent by Weight Based on Weight of Total Composition | |
|---|---|---|
| Deionized Water | 32.895 | |
| TEA (triethanolamine) | 3.8 | chelating agent (detergent builder) for neutralizing heavy minerals such as Ca++ and Mg++ in water ((85% triethanolamine min, monoethanolamine .5% max, diethanolamine 15% max) |

-continued

| Ingredients | Percent by Weight Based on Weight of Total Composition | |
|---|---|---|
| Alumina | 1.0 | particle size of 200 nm (nano) (median particle diameter 0.24 microns) |
| CELITE super fine super floss | 20.0 | CELITE (flux calcined diatomaceous earth) plankton marine diatomite, fine powder, median particle size 5.0 microns. (SiO2 89.6%, Al2O3 4.0, Fe2O3 1.3, P2O5.2, TiO2.2CaO .5, MgO .6 and Na2O + K2O 3.3%) |
| CONOSOL C-200 | 27.7 | hydrocarbon solvent (middle distillates) |
| Stearic acid | 8.3 | (Octadecanoic acid, (50% hexadecanoic acid, 45.5% octadecanoic acid, 2.5% tetradecanoic acid, and 1.5% margaric acid) |
| BURCOTERGE LFE 1000 | 3.0 | Controlled foam nonionic surfactant (removes Silicone oils, detergent for oil and grease, emulsifies oils and greases to prevent re-deposition) |
| LUBEROS 8555 | 3.0 | Corrosion inhibitor (Oil soluble formulated blend for use in formulating oil and/or solvent based rust preventives, forms protective non-staining coating for short term use, imparts rust preventive properties to formulations and in low viscosity oil/solvent as a base with water insoluble lubricant additive such as esters, oleates, or polishes and is oil soluble (15-20% nap oil (100-200 sus0, 5-10% water insoluble additive and balance mineral spirits) |
| Liquitint blue 185010 (color) | 0.005 | polymeric colorants |
| Bubble gum flavor | .20 | flavor |
| SURCIDE P | 0.1 | preservative |

FIG. 3 is a comparison photograph showing a panel treated with a polish according to the composition of Example 1 as (Formulation A) of the present invention; together with panels treated with a leading competitor's metal polish cream Product, (Formulation B); and a leading competitor's mag and aluminum polish, (Formulation C); and (D an untreated panel), all of which were subjected to the same Humidity Chamber Corrosion Test. The tests show the superior performance of the formulation in accordance with the present invention as compared to competitive products and untreated surfaces.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:
1. A metallic polish composition, comprising:
an oil soluble corrosion inhibitor in an amount of about 3.0 percent by weight based on the total weight of the composition;
a nonionic surfactant in an amount of about 3.0 percent by weight based on the total weight of the composition;
a stearic acid in an amount of about 8.3 percent by weight based on the total weight of the composition;
a hydrocarbon solvent comprising a middle distillate in an amount of about 27.7 percent by weight based on the total weight of the composition;
a chelating agent comprising a triethanolamine in an amount of about 3.8 percent by weight based on the total weight of the composition;
a calcined diatomaceous earth having a median particle size of about 5 microns in an amount of about 20.0 percent by weight based on the total weight of the composition;
an aluminum oxide having an average particle size of 20 nanometers and median particle diameter of 0.24 microns in an amount of about 1.0 percent by weight based on the total weight of the composition; and
water in an amount of about 33 percent by weight based on the total weight of the composition.

2. The metallic polish composition of claim 1, further comprising colorants in an amount from 0.005 to 1.0 percent by weight based on the total weight of the composition.

3. The metallic polish composition of claim 1, further comprising a fragrance in an amount from 0.001 to 1.0 percent by weight based on the total weight of the composition.

4. The metallic polish composition of claim 1, further comprising a preservative in an amount from 0.05 to 1.0 percent by weight based on the total weight of the composition.

* * * * *